(12) United States Patent
McLaughlin

(10) Patent No.: US 9,659,197 B2
(45) Date of Patent: May 23, 2017

(54) MEMORABILIA PROVENANCE AUTHENTICATION

(71) Applicant: Provenance, San Carlos, CA (US)

(72) Inventor: Glen McLaughlin, Saratoga, CA (US)

(73) Assignee: Provenance, San Carlos, CA (US)

( * ) Notice: Subject to any disclaimer, the term of this patent is extended or adjusted under 35 U.S.C. 154(b) by 224 days.

(21) Appl. No.: 14/335,848

(22) Filed: Jul. 18, 2014

(65) Prior Publication Data

US 2015/0026205 A1 Jan. 22, 2015

Related U.S. Application Data

(60) Provisional application No. 61/856,918, filed on Jul. 22, 2013.

(51) Int. Cl.
*G06F 17/30* (2006.01)
*G06K 7/10* (2006.01)
*G06Q 10/08* (2012.01)
*G06Q 50/28* (2012.01)

(52) U.S. Cl.
CPC ..... *G06K 7/10366* (2013.01); *G06Q 10/0833* (2013.01); *G06Q 50/28* (2013.01)

(58) Field of Classification Search
CPC ............... G06F 17/30; G06F 17/30876; G06F 17/30879; G06K 7/10366

USPC .................................................. 707/600–899
See application file for complete search history.

(56) References Cited

U.S. PATENT DOCUMENTS

2013/0173703 A1\* 7/2013 Burris ..................... G06F 9/445
709/204

\* cited by examiner

*Primary Examiner* — Isaac M Woo
(74) *Attorney, Agent, or Firm* — Polsinelli LLP

(57) ABSTRACT

Embodiments of the invention for the track, categorize, or authenticate the provenance of historical artifacts. The invention couples an artifact to at least one unique identifier. Unique identifiers may be attached to or be contained within an artifact. Unique identifiers are coupled to a data storage archive where historical information relating to the artifact are stored. In certain embodiments the data storage archive is a database or relational database. Artifacts incorporated into the invention, may be objects used in sports, be objects used in politics, or may be personal objects. The invention tracks the use of artifacts and records historical information corresponding to the artifact in the data storage archive. Historical information recorded may include the time, or place where an artifact was used. The invention, in certain embodiments also tracks the use of the movement of an artifact, tracks who interacted with the artifact, and provides a mechanism for collectors to review historical information corresponding to one or more particular artifacts.

11 Claims, 3 Drawing Sheets

MEMORABILIA PROVENANCE AUTHENTICATION

CROSS-REFERENCE TO RELATED APPLICATIONS

The present application claims the priority benefit of U.S. provisional application No. 61/856,918 filed Jul. 22, 2013 and entitled "Memorabilia Provenance Authentication," the disclosure of which is incorporated herein by reference.

BACKGROUND OF THE INVENTION

Field of the Invention

The present invention generally relates to documenting, authenticating, and retrieving historical information relating to one or more artifacts. The present invention more specifically relates to coupling an artifact to at least one unique identifier that may be attached to or contained within an artifact; such identifiers are coupled to historical information related to the artifact.

Description of the Related Art

Artifacts associated with historical events are frequently prized by collectors of memorabilia. Collectors typically only have limited means of authenticating that a particular artifact is genuine. Conventionally authenticity of an artifact may be established by the presence of a signature on the artifact, the judgment of an expert who has inspected the artifact, or by an owner of the artifact swearing to the authenticity of the artifact.

Frequently artifacts have no inherent identifier that identifies them as being associated with a historical event. For example a baseball hit out of the park by Willie Mays would carry no identification that it was in fact hit by Willie Mays, unless the baseball were subsequently signed by Willie Mays or authenticated by a baseball representative.

A system and method for associating provenance to an artifact would therefore benefit collectors immensely.

SUMMARY OF THE INVENTION

Embodiments of the invention include a system and method of uniquely identifying one or more artifacts. Typically a unique identifier is connected to an artifact. The unique identifier may be attached to, placed on, or place inside of the artifact. In certain embodiments of the invention the unique identifier is connected to the artifact when it is manufactured.

In certain embodiments, the invention enables one to correlate a particular time of interest to the presence or use of an artifact at a historical event.

Embodiments of the invention store historical information relating to the presence or use of an artifact. Storing information relating to when or where an artifact was used is an object of the invention. Such information may be stored in an archive. Such a data storage archive may reside wholly or partially within the artifact, be stored in a data collection apparatus, or be sent for storage to a computer or a data center. An artifact coupled to a data storage archive will be referred to in this disclosure as an archivable object or simply an artifact that incorporates attributes associated with the invention.

Retrieving historical information about the artifact, and using the unique identifier to authenticate the artifact are other objects of the invention.

Certain embodiments of the invention record the current owner of the artifact, past owners of the artifact, groups or individuals that may add ancillary value to the artifact, or groups or individuals who might have an interest in the artifact.

Artifacts tracked by the invention typically relate to sports memorabilia, including memorabilia associated with yet not limited to baseball, golf, tennis, football, and soccer. The invention is not limited to sport memorabilia however. In certain instances the invention may be used to track any object, including artifacts associated with politics or personal items.

Unique identifications can be either visible and/or non-visible. For example, in certain embodiments, an Radio Frequency Identifier (RFID) unit implanted within the artifact could be read by an RFID reader located outside of the artifact is an example of a non-visible unique identifier. In certain other embodiments of the invention visible unique identifiers include yet are not limited to a serial number, a barcode, or a quick response (QR) code.

The invention may include passive or active unique identifiers. An example of a passive unique identifier is a bar code that may be scanned by another apparatus. An example of active unique identifier include an RFID coupled to a microprocessor and memory. Alternatively an active unique identifier may include an integrated circuit coupled to a memory.

Furthermore the system or method of the invention can include additional levels of security that prevent the artifacts authentication data from being tampered with. For example, in certain embodiments, in order to read an RFID, the reading unit could provide a coded string (a key) that enables the RFID unit to respond to an inquiry from a RFID reader.

Those skilled in the art of unique identification would realize once reading this disclosure, that there are numerous ways of achieving the goal of securely interacting with a unique identifier.

The unique identifier, in certain embodiments, may be dynamic. For example a security challenge code may change each time the unique identifier is activated.

Other embodiments of the invention may include separate methods for identifying and artifact for authenticating an artifact. The invention may also include an energy harvesting apparatus, or GPS location apparatus. The invention may be configured to include information relating to physical attributes of the artifact, or include information relating to time; date; or location of a historical event associated with the artifact.

DETAILED DESCRIPTION OF THE INVENTION

Figure 1:
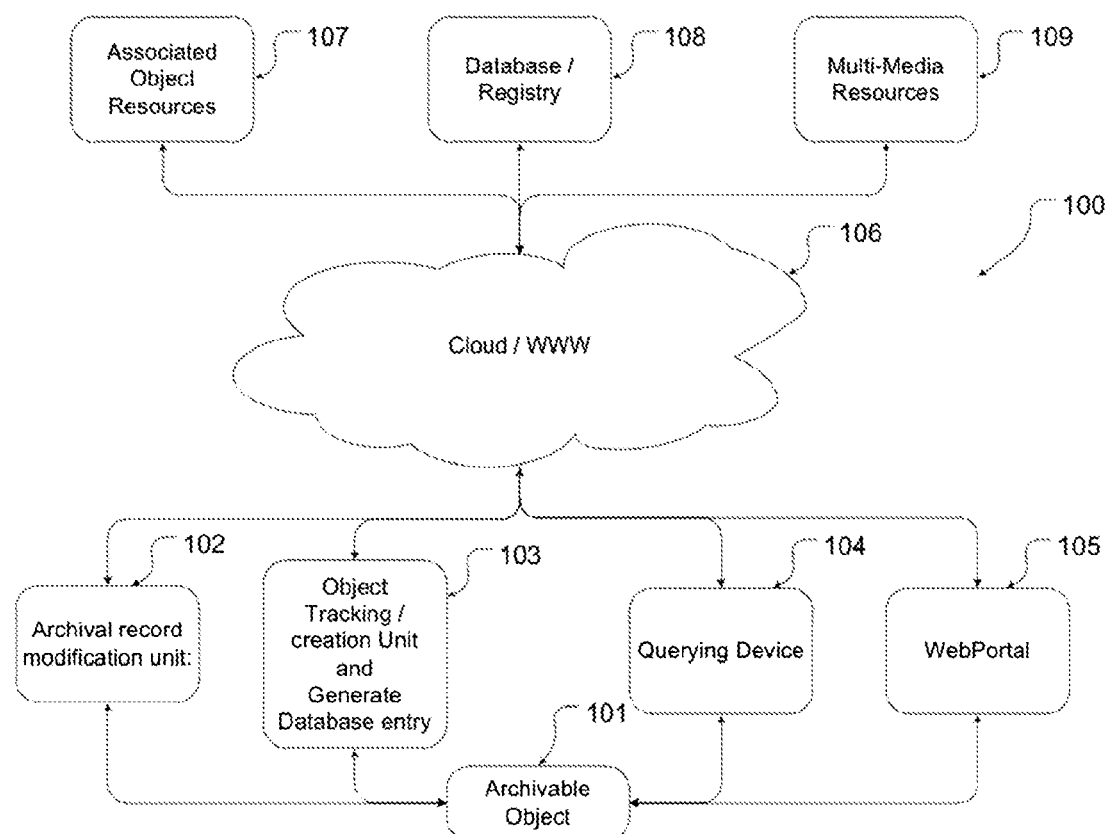
FIG. 1 illustrates a high level interaction pathway between a database and an archivable object.

Embodiments of the invention include a system and method of uniquely identifying one or more artifacts. Typically a unique identifier is connected to an artifact. The unique identifier may be attached to, placed on, or place inside of the artifact. In certain embodiments of the invention the unique identifier is connected to the artifact when it is manufactured.

In certain embodiments, the invention enables one to correlate a particular time of interest to the presence or use of an artifact at a historical event.

Embodiments of the invention store historical information relating to the presence or use of an artifact. Storing information relating to when or where an artifact was used is an object of the invention. Such information may be stored in an archive. Such a data storage archive may reside wholly or partially within the artifact, be stored in a data collection apparatus, or be sent for storage to a computer or a data center. An artifact coupled to a data storage archive will be referred to in this disclosure as an archivable object or simply an artifact that incorporates attributes associated with the invention.

Retrieving historical information about the artifact, and using the unique identifier to authenticate the artifact are other objects of the invention.

Certain embodiments of the invention record the current owner of the artifact, past owners of the artifact, groups or individuals that may add ancillary value to the artifact, or groups or individuals who might have an interest in the artifact.

Artifacts tracked by the invention typically relate to sports memorabilia, including memorabilia associated with yet not limited to baseball, golf, tennis, football, and soccer. The invention is not limited to sport memorabilia however. In certain instances the invention may be used to track any object, including artifacts associated with politics or personal items.

Unique identifications can be either visible and/or non-visible. For example, in certain embodiments, an Radio Frequency Identifier (RFID) unit implanted within the artifact could be read by an RFID reader located outside of the artifact is an example of a non-visible unique identifier. In certain other embodiments of the invention visible unique identifiers include yet are not limited to a serial number, a barcode, or a quick response (QR) code.

The invention may include passive or active unique identifiers. An example of a passive unique identifier is a bar code that may be scanned by another apparatus. An example of active unique identifier include an RFID coupled to a microprocessor and memory. Alternatively an active unique identifier may include an integrated circuit coupled to a memory.

Furthermore the system or method of the invention can include additional levels of security that prevent the artifacts authentication data from being tampered with. For example, in certain embodiments, in order to read an RFID, the reading unit could provide a coded string (a key) that enables the RFID unit to respond to an inquiry from a RFID reader.

Those skilled in the art of unique identification would realize once reading this disclosure, that there are numerous ways of achieving the goal of securely interacting with a unique identifier.

The unique identifier, in certain embodiments, may be dynamic. For example a security challenge code may change each time the unique identifier is activated.

When separate methods for identification and for authentication of an artifact are used, the identification code could be readily available, and access to authentication information of the artifact, in some embodiments, require the use of a higher level security code.

Sometimes it might be advantageous for an apparatus of the invention to be equipped with an energy harvesting unit so that it can have an additional method of communicating with the outside world by imparting sufficient energy into the apparatus.

In yet other embodiments of the invention, physical attributes of an artifact are recorded during the manufacturing process of the artifact. Such physical attributes recorded include yet are not limited to the dimensions, the weight, and the serial number of the artifact. For example the dimensions, weight, or serial number of a picture may be recorded during or after the manufacturing of the apparatus. These attributes can be used to help authenticate the artifact. In certain circumstances such attributes may be kept secret, in other circumstances these attributes may be made public.

Certain other embodiments of the invention use one or more data collection apparatuses to collect time based information about an artifact. For example, there might be a sensing device attached to a baseball umpire's ball bag. When the umpire removes a ball from the ball bag, a record of a ball previously in play is closed out, and the new record corresponding to the new ball is opened. This could be accomplished with a reading device mounted at the top of the ball bag. The reading device senses the removal of the ball and reads the unique identifier of the ball being placed into play. Such a data collection apparatus determines that the baseball has entered into a particular "time of interest". The sensing device attached to the ball bag could be designated as a primary data collection apparatus that creates an initial entry into a data storage archive associated with the artifact. Such a data storage achieve may reside wholly or partially within the artifact, be stored in a data collection apparatus, or be sent for storage to a computer or a data center.

Typically a primary data collection apparatus has a means for reading the unique identifier and pertinent information associated with the artifact. Such information may include the current time, the date, and the GPS location of the artifact.

Examples of secondary data collection apparatuses include scanners or sensing devices located throughout the ball park where fans who caught a ball could scan the ball. Such devices could be held by first or third base umpires. In yet other instances, when there is a desire for tracking how the ball is played, a sensor at the pitcher's mound would actively read the identification of the artifact in the pitchers possession. There could also be a sensor that reads the identification of the artifact as it crossed home plate. As anyone skilled in the art of making unique identification reading devices would easily recognize that there are several other techniques that could be used to ensure accuracy of the historical activities of the artifact.

Tracking the artifact while it is used may include manual methods, or automated methods. An example of a manual method for tracking activity of an artifact is a person taking notes and entering them directly into the database. An example of an automatic method for tracking the activity of an artifact is where a plurality of data collection sensors distributed around a sports arena sense the use of the artifact at different locations in the sports arena and transmit those movements to a database. In certain embodiments, the database is configured to store information collected manually and automatically.

The invention is not limited to using sensors sensing the use of an artifact. Other types of sensors may collect information relating to the environmental factors or weather at an event. Automatic feeds measuring wind speed, temperature, precipitation or other environmental factors may be sensed using additional sensors coupled to a database.

Such data relating to environmental factors may include timestamps that may be used to correlate an artifact to its use during a broadcast. Environmental data and artifact data may be combined with video, radio, or picture data compiled during a sporting event. If the invention were deployed at the time of the 1989 Loma Prieta earthquake that occurred during the World Series in San Francisco, for example, it would have been possible to correlate the ball in play at the time of the event so that it could be preserved for historical reasons.

The method used to store all historical information generated from the artifact consists of a repository that is capable of retaining all the information associated with and around the artifact. This can be accomplished via a relational database.

Sometimes there are items that cannot be stored in a digital means. In these instances data may be entered into additional or ancillary fields in the database. These additional or ancillary fields may be used within a querying context context-aware database. Such databases include distributed databases, and a single monolithic database. In the instance of a distributed database, for example, there could be connections to other databases where additional ancillary information relating to the artifact may be acquired. Such additional ancillary information could include new previously unseen footage of a sporting event when an artifact was used.

This provides a means to obtain information associated with the object more on as requested or on an as needed basis rather than having to store the entire history of all the archivable objects within a single database.

The method used to relate the stored information of the artifact to other historical events coincident with when the artifact was being used consists of being able to store pertinent information about the artifact when it is in an active mode. For example time, date, GPS coordinates, event type, and the like may be recorded. This information can then be used to associate surrounding information with the artifact. For example, television coverage at the time ball was in play, the bat used by the hitter, the glove used by the catcher or pitcher, a signed picture of the team or an individual, or information relating to who was in the stands could be recorded in one or more databases. Even the presence of a significant political figure, or a political event at the sporting event could be recorded. Being able to access this information from one or more databases would allow one to retrieve pertinent information relating to the collectability of one or more artifacts.

Thus, certain embodiments of the invention, retrieve the historical information about the artifact from one or more databases. Such information may include authentication information, unique identifier information, and information collected by a plurality of other recording devices.

Data collected by a relational database, and associated relational databases may be parsed for information associated with one or more particular artifacts. This information may be used to determine the relevance of an artifact over time. The historical significance of a particular artifact may become more apparent as time passes. For example, in baseball there are a number of individuals who touch a baseball during the plays. In certain instances, a turning point of a World Series might be associated with a single play. This might not be realized until after the World Series finished. Conventionally it would be difficult or impossible to associate such a turning point with artifacts in use at the time of the turning point. The invention described herein enables individuals to associate players, or other data to artifacts used at the moment of the turning point.

The method of connecting the current owner of the artifact to groups or individuals who might be able to add ancillary value to the artifact. Relational databases of the media, and other information sources potentially contain information that will increase the value of an artifact. For example, a baseball caught by a spectator of a baseball game might wish to get the ball signed by a player who interacted with the ball. It might be the player who hit the ball, be a player who caught the ball, or be the pitcher who pitched the ball. The value of the artifact to collectors is enhanced each time significant historical events are associated with the artifact.

In yet other instances, the owner of an artifact might want to get a signed photograph of the player, or garner media coverage emphasizing historical events associated with the ball.

There are obviously a number of items that could be easily associated with a baseball when sufficiently tracked. For example, the glove of the pitcher, the bat of the hitter, the bases that were used, and the like. All of these items when viewed as singular entities might not be considered significant. If, however, they were able to be brought together as a whole, the value of the artifacts would be enhanced.

This is not the only way of providing additional value to the owner of the artifact. Potentially the owner of the artifact might wish to sell or give the artifact to an avid collector. For example, the ball might be associated with a player who only played a few seasons, and the player might enjoy owning a ball they interacted with on a certain occasion.

In yet other circumstances the artifact may represent a family memento. Families, parents, or grandparents might wish to leave such artifacts to their children or grandchildren. Such family artifacts would include a persistent record of the significance of the artifact. The artifact might have been used in a game where an individual proposed to their significant other.

Such artifacts may be registered with an owner. Other individuals seeking artifacts associated with a specific event could search through a relational database to find authenticated artifacts of interest. Furthermore those other individuals could offer to purchase such an artifact from the owner.

FIG. 1 illustrates a high level interaction pathway that includes a database and an archivable object. FIG. 1 shows the high level interaction pathway 100 including an Archivable Object 101 interacting, Archivable Mechanisms (102, 103, 104, 105), and a communications infrastructure 106. Also included in the high level interaction pathway 100 are various mechanisms (107, 109) for archiving, retrieving, authenticating, and for adding supplemental information to a Database/Registry 108.

The Archivable Object 101, contains a unique identifier, including yet not limited to an RFID tag. This unique identifier can also incorporate secondary security protocols to prevent fraud. The secondary security protocols, in certain embodiments, can also detect and discriminate against non-authentic artifacts. The Archivable Object 101, is an artifact coupled to a means for storing historical information corresponding to the artifact. In certain circumstances, an Archivable Object 101 can at the onset have a Database/Registry 108 entry associated with the Archivable Object 101 when Archivable Object 101 is manufactured. In certain other circumstances, the Database/Registry 108 can generate a new entry upon entering into a track-able time period, this occurs in unit 103 (Object Tracking/creation Unit and Generate Database entry).

When the tracking of an artifact is initiated and when there is not an entry for the archivable object in the Database/Registry 108, the Object Tracking/creation Unit and Database entry generation device 103 initiates the creation of a new Database/Registry 108 entry. When an entry already exists then the Archival record modification unit 102 is used to provide additional information to the Database/Registry 108. Both the Archival record modification unit 102 and the Object Tracking/creation Unit and Generate Database entry 103 devices also have the ability to collect ancillary information beyond basic tracking information. For example they can add information like date, time, GPS coordinates, temperature, wind speed, pictures, video, and/or the like. All of this ancillary information may be captured in the Database/Registry 108. This ancillary information may also be correlated to the historical record of the Archivable Object 101.

The main communications method between the Archivable record modification unit 102 and the Object Tracking/creation Unit and Generate Database entry 103 unit is the Cloud/WWW 106. The Cloud/WWW 102 communication mechanism may use any known data communication network common in the art including yet not limited to a cellular network, a local area network (LAN), a wide area network (WAN), a land line, FAX, postal service, or the like. The Cloud/WWW 106 is also a path used by a Querying Device 104. A Querying Device 106 is a device used to interact with the Database/Registry 108. The Querying Device 106 may be used to obtain or possibly to update information associated with the Archivable Object 101.

In certain circumstances, information contained in the Database/Registry 108 could be augmented with other sources of information that are historically associated with the archivable object 101. Associated object resources 107 and Multi-Media Resources 109 contain information that may be associated with one or more Archivable Objects 101. The Associated object resources 107 can be in electronic form, or in some other form. Associated object resources 107 include, for example, a signed photograph associated with the Archivable Object 101. Multi-Media Resources 109 can include a video or audio recording associated with an Archivable Object 101.

Objects associated with an Archivable Object 101 may be associated by evaluating the time the various objects were tracked. Typically Associated Object Resources 107, Database/Registry 108 and Multi-Media Resources 109 can be accessed via a WebPortal 105.

In such embodiments the WebPortal 105 typically communicates through the Cloud/WWW 106 communication interface. Such a system provides the owner of an archivable object 101 the ability to discover previously unknown information relating to the archivable object 101. The invention is not limited to using a WebPortal 105 to communicate with the Database/Registry 108, interactions of this sort can also occur through other communication interfaces including yet not limited to methods phone, FAX, conferences, and the like.

Figure 2:
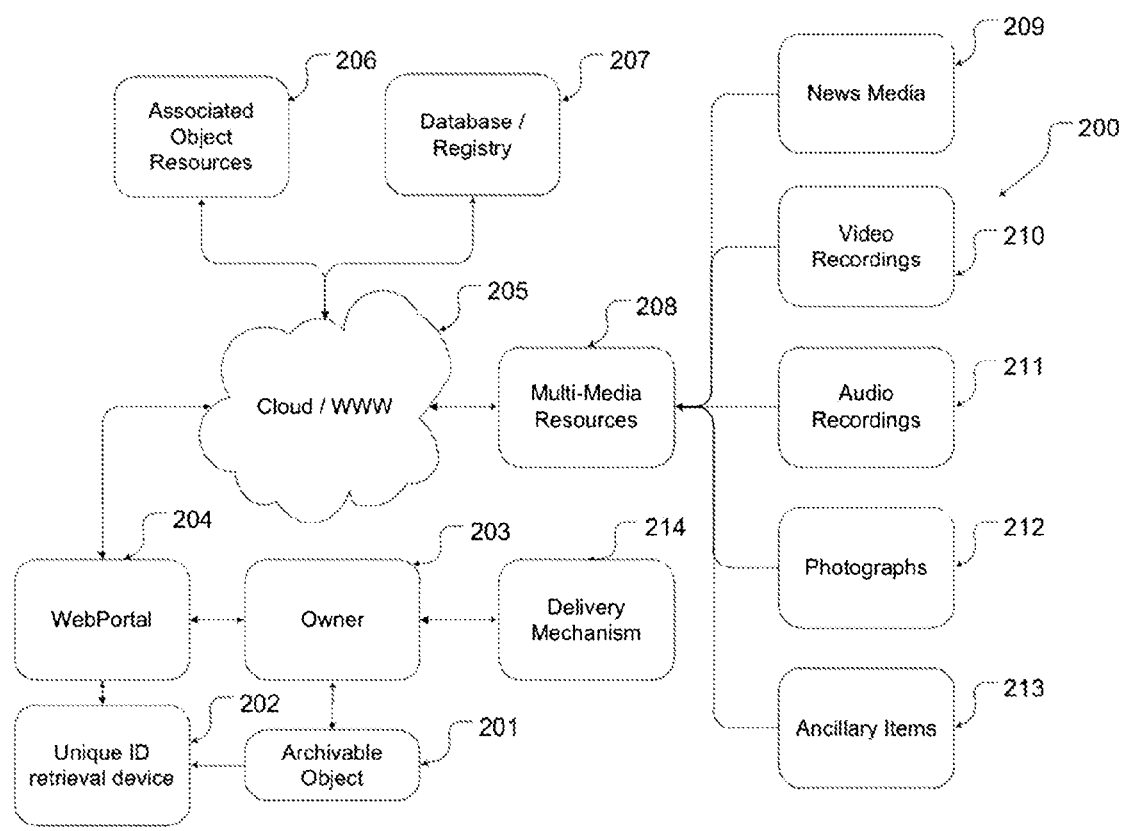
FIG. 2 illustrates an owner of an archivable object researching and interacting with the history associated with an archivable object.

FIG. 2 illustrates an owner of an archivable object researching and interacting with the history associated with an archivable object. FIG. 2 depicts an Owner 203 of an Archivable Object 201 interacting with a system 200. System 200 includes devices, services, and recordings of historical information relating to the Archivable Object 201. The Owner 203 may request additional supporting memorabilia or documentation associated with the Archivable Object 201 and have it delivered by specifying a Delivery Mechanism 214.

The Owner 203 of an Archivable Object 201 can start a transaction relating to the Archivable Object 201 by interacting with a Unique ID retrieval device 202 that is capable of reading the unique ID of the Archivable Object 201. The Unique ID retrieval device 202, in certain instances, may require something as simple as entering the serial number of the Archivable Object 201 into the WebPortal 204. In other instances an RFID device with additional security are entered into the WebPortal 204. The WebPortal 204 communicates through communication interface Cloud/WWW 205 to query the Database/Registry 207. The Database/Registry 207 typically contains the a primary historical archive of the Archivable Object 201. The information contained within the Database/Registry 207 can also be used to initiate additional queries into other Associated Object Resources 206, or Multi-Media Resources 208. From these queries and communications through the Cloud/WWW 205 to the WebPortal 204, the Owner 203 can obtain a listing of the objects provenance. Such queries may also seek obtain information relating to other artifacts or multi-media items that are associated with the Archivable Object 201. Items that might be offered from the Multi-Media Resources 208 include New Media 209, Video Recordings 210, Audio Recordings 211, Photographs 212, and Ancillary Items 213 related to the archivable object 201 based on a selection criteria.

Historical information from various sources can be collected and delivered to the owner via Delivery Mechanism 214. The Delivery Mechanisms 214 include yet are not limited to delivery of electronic information through the Cloud/WWW 205, or the delivery of physical items using the postal service. It should be noted that communications path can be done via several different means including yet not limited to a WebPortal 204, a phone call, a smart phone, or through direct interaction with an individual.

Figure 3:
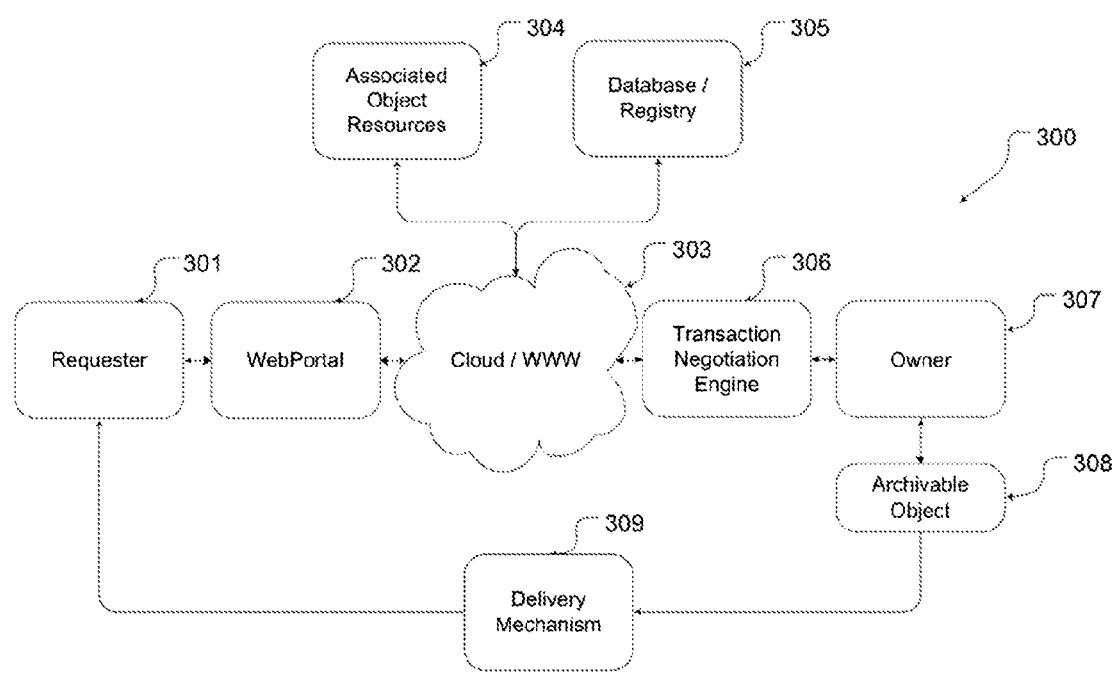
FIG. 3 illustrates interactions between a requestor searching for an archivable object with a desired provenance, and that requestor brokering a transaction to acquire the archivable object.

FIG. 3 illustrates interactions 300 between a requestor searching for an archivable object with a desired provenance, and that requestor brokering a transaction to acquire the archivable object. FIG. 3 shows a Requester 301 using a WebPortal 302 to communicate with a Database/Registry 305 through the Cloud/WWW 303. The Requestor 301 searches the Database/Registry 305 for an Archivable Object 308 with a desired provenance. The Requester may also interact with the Associated Object Resources 304 when performing his search.

Once the Requestor 301 has found an Archivable Object 308 of interest he will interact with the Transaction Negotiation Engine 306 to broker a deal between then Owner 307 of the Archivable Object 308.

For example, a Requestor 301 searching for a baseball that can from a no-hitter game that they had attended begins reviewing records in the Database/Registry 305. Once the Requestor 301 finds a Archivable Object 308 of interest, he could contact the known Owner 307 of the Archivable Object 308 to see if there was a possible transaction that could be brokered. When no known owners can be found Database/Registry 305, the Requestor could save a record referencing provenance attributes for Archivable Objects 308 that he is searching form.

When an Archivable Object 308 of interest is found within the Database/Registry 305 the Requestor 301 contacts the Owner 307 through the Transaction Negotiation Engine 306 to see if there was a deal to be brokered. Once a deal is brokered for the Archivable Object 308, a Delivery Mechanism 309 is selected by the Requester 301. Based upon the terms agreed to via the Transaction Negotiation Engine 306, the Archivable Object 308 is delivered. Terms for acquiring the Archivable Object 308 could be based on a barter, cash, trade, or be some other transaction. Similar mechanisms may be used by an Owner 307 of the Archivable Object 308 to register the Archivable Object 308 with the database registry 305.

What is claimed is:

1. A system for establishing the provenance of artifacts, the system comprising:
    a scanning device that detects one or more unique identifiers associated with an artifact, wherein a provenance of the artifact affects a corresponding valuation of the artifact; and
    a database that maintains:
        a record of the one or more unique identifiers, and wherein at least one of the one or more the unique identifiers are associated with updating information regarding changes in the provenance of the artifact, and wherein the provenance of the artifact is updated concurrently with the scanning of at least one of the unique identifiers associated with the artifact by the scanning device; and
        multi-media information associated with the artifact, the multi-media information retrieved in response to a query corresponding to the artifact or a unique identifier of the one or more unique identifiers associated with the artifact.

2. The system of claim 1, further comprising an input device for augmenting the database with historical information about the artifact.

3. The system of claim 2, wherein the historical information includes one or more of a date, time, or GPS coordinate associated with the provenance of the artifact.

4. The system of claim 1, wherein the unique identifier includes a barcode.

5. The system of claim 1, further comprising a mechanism for generating a dynamic security code that correlates to the one or more unique identifiers.

6. The system of claim 1, wherein historical information associated with the artifact includes a signature and an authentication certificate.

7. The system of claim 1, further comprising a network connection that allows for a data communication device to access the database.

8. The system of claim 7, wherein access to the database by the data communication device requires presentation of a data security string.

9. The system of claim 7, wherein the database provides terms for acquiring ownership of an artifact responsive to a user query as to the ownership of the artifact.

10. The system of claim 1, wherein the unique identifier includes a QR code.

11. The system of claim 1, wherein the unique identifier includes an radio frequency identifying (RFID) tag.

* * * * *